(12) United States Patent
Ngo et al.

(10) Patent No.: US 8,665,967 B2
(45) Date of Patent: Mar. 4, 2014

(54) METHOD AND SYSTEM FOR BIT REORGANIZATION AND PACKETIZATION OF UNCOMPRESSED VIDEO FOR TRANSMISSION OVER WIRELESS COMMUNICATION CHANNELS

(75) Inventors: Chiu Ngo, San Francisco, CA (US); Huai-Rong Shao, San Jose, CA (US); Harkirat Singh, Santa Clara, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 1750 days.

(21) Appl. No.: 11/635,969

(22) Filed: Dec. 7, 2006

(65) Prior Publication Data

US 2007/0189397 A1      Aug. 16, 2007

Related U.S. Application Data

(60) Provisional application No. 60/773,828, filed on Feb. 15, 2006.

(51) Int. Cl.
*H04N 11/02*      (2006.01)

(52) U.S. Cl.
USPC ............. 375/240.26; 375/240.02; 382/100; 382/232; 382/239; 382/240; 382/248; 455/102; 714/758; 714/774

(58) Field of Classification Search
USPC .......... 375/240.2–26; 382/100–248; 455/102; 714/758–774
See application file for complete search history.

(56) References Cited

U.S. PATENT DOCUMENTS

| 5,214,656 | A | * | 5/1993 | Chung et al. ................. 714/758 |
| 5,233,348 | A | | 8/1993 | Pollmann et al. |
| 5,680,129 | A | | 10/1997 | Weinberger et al. |
| 5,978,545 | A | | 11/1999 | Kato et al. |
| 6,108,382 | A | | 8/2000 | Gringeri et al. |
| 6,201,834 | B1 | | 3/2001 | Zhu |
| 6,519,005 | B2 | | 2/2003 | Bakhmutsky et al. |
| 6,532,268 | B1 | | 3/2003 | Morisawa et al. |
| 6,539,448 | B1 | * | 3/2003 | Deng ........................... 710/260 |
| 6,597,402 | B1 | | 7/2003 | Butler et al. |

(Continued)

FOREIGN PATENT DOCUMENTS

| JP | 2003152733 A | 5/2003 |
| WO | 2004034654 A1 | 4/2004 |
| WO | 2004073201 A1 | 8/2004 |

OTHER PUBLICATIONS

U.S. Non-Final Office Action for U.S. Appl. No. 11/833,919 mailed May 4, 2011.

(Continued)

*Primary Examiner* — William C Vaughn, Jr.
*Assistant Examiner* — Luis M Perez
(74) *Attorney, Agent, or Firm* — Kenneth L. Sherman, Esq.; Michael Zarrabian, Esq.; Sherman & Zarrabian LLP (57) ABSTRACT

A method and a system for bit reorganization and packetization of uncompressed video for transmission over wireless communication channels. The bit stream of the uncompressed video is reorganized according to importance levels of video bits. Then, various unequal protection methods such as encoding are applied to bits at different video importance levels. The reorganized and encoded information is then transmitted from a transmitter to a receiver over a wireless channel. The receiver performs the reverse steps of the transmitter, along with error detection/correction as needed, to recover the uncompressed video information.

56 Claims, 7 Drawing Sheets

(56) References Cited

U.S. PATENT DOCUMENTS

| | | | |
|---|---|---|---|
| 6,618,397 B1 | 9/2003 | Huang | |
| 6,747,993 B2 | 6/2004 | Rinchiuso | |
| 6,756,921 B2 | 6/2004 | Kimura et al. | |
| 6,801,665 B1* | 10/2004 | Atsumi et al. | 382/239 |
| 6,868,186 B1 | 3/2005 | Sadeh | |
| 6,879,266 B1 | 4/2005 | Dye et al. | |
| 6,915,016 B2 | 7/2005 | Varshney et al. | |
| 6,966,065 B1 | 11/2005 | Kitazato et al. | |
| 7,016,545 B1* | 3/2006 | Schwartz et al. | 382/239 |
| 7,043,210 B2* | 5/2006 | Zhu et al. | 455/102 |
| 7,161,957 B2 | 1/2007 | Wang et al. | |
| 7,184,588 B2 | 2/2007 | Proteau et al. | |
| 7,313,810 B1 | 12/2007 | Bell et al. | |
| 7,340,764 B2 | 3/2008 | Kubota et al. | |
| 7,444,023 B2* | 10/2008 | Mossakowski | 382/232 |
| 7,492,789 B2 | 2/2009 | Shvodian | |
| 7,499,565 B2* | 3/2009 | Fujii et al. | 382/100 |
| 7,512,180 B2 | 3/2009 | Florencio | |
| 7,752,647 B2 | 7/2010 | Fung | |
| 7,792,375 B2* | 9/2010 | Mizuno | 382/240 |
| 7,868,879 B2 | 1/2011 | Rizko | |
| 8,006,168 B2* | 8/2011 | Reznic et al. | 714/774 |
| 2002/0042917 A1 | 4/2002 | Townsend et al. | |
| 2002/0071485 A1* | 6/2002 | Caglar et al. | 375/240.01 |
| 2002/0118763 A1 | 8/2002 | Harris et al. | |
| 2002/0184384 A1 | 12/2002 | Simmon et al. | |
| 2003/0118107 A1* | 6/2003 | Itakura et al. | 375/240.19 |
| 2003/0174243 A1 | 9/2003 | Arbeiter et al. | |
| 2004/0253980 A1* | 12/2004 | Lane | 455/552.1 |
| 2005/0036546 A1* | 2/2005 | Rey et al. | 375/240.12 |
| 2005/0089105 A1* | 4/2005 | Zhang et al. | 375/240.27 |
| 2005/0123042 A1 | 6/2005 | Park et al. | |
| 2005/0175251 A1* | 8/2005 | Taketa et al. | 382/248 |
| 2005/0208961 A1 | 9/2005 | Willenegger | |
| 2007/0014356 A1 | 1/2007 | Han et al. | |
| 2007/0047485 A1 | 3/2007 | Gorokhov et al. | |
| 2007/0097257 A1 | 5/2007 | El-Maleh et al. | |
| 2007/0098063 A1* | 5/2007 | Reznic et al. | 375/240.2 |
| 2007/0110396 A1 | 5/2007 | Itoh et al. | |
| 2007/0189383 A1 | 8/2007 | Shao et al. | |
| 2007/0195893 A1 | 8/2007 | Kim et al. | |
| 2007/0202842 A1 | 8/2007 | Shao et al. | |
| 2007/0202843 A1 | 8/2007 | Niu et al. | |
| 2007/0206875 A1 | 9/2007 | Ida et al. | |
| 2007/0223823 A1 | 9/2007 | Islam et al. | |
| 2007/0230461 A1 | 10/2007 | Singh et al. | |
| 2007/0234134 A1 | 10/2007 | Shao et al. | |
| 2007/0268972 A1 | 11/2007 | Kim | |
| 2008/0037624 A1 | 2/2008 | Walker et al. | |
| 2008/0043832 A1 | 2/2008 | Barkley et al. | |
| 2008/0063069 A1 | 3/2008 | Sekiguchi et al. | |
| 2008/0123739 A1 | 5/2008 | Reznic et al. | |
| 2008/0144553 A1 | 6/2008 | Shao et al. | |
| 2008/0204461 A1 | 8/2008 | Hutchins et al. | |
| 2009/0021646 A1 | 1/2009 | Shao et al. | |
| 2009/0063935 A1 | 3/2009 | Singh et al. | |
| 2009/0086638 A1 | 4/2009 | Niu et al. | |
| 2009/0086699 A1 | 4/2009 | Niu et al. | |
| 2009/0109866 A1 | 4/2009 | Kim et al. | |
| 2009/0241147 A1 | 9/2009 | Kim et al. | |
| 2009/0265744 A1 | 10/2009 | Singh et al. | |

OTHER PUBLICATIONS

U.S. Final Office Action for U.S. Appl. No. 12/107,685 mailed Apr. 21, 2011.

Hitachi Ltd. et al. High-Definition Multimedia Interface (HDHI) Specifications version 1.2, Aug. 22, 2005.

Wang, Y. et al., "Error Control and Concealment for Video Communciation: A Review," Proceedings of the IEEE, vol. 86, No. 5, May 1998, pp. 974-997, United States.

Gharai, L. et al., "RTP Payload Format for Uncompressed Video," Network Working Group, The Internet Society, Sep. 2005, pp. 1-17, United States.

Maruhashi, K. et al., "Wireless Uncompressed-HDTV-Signal Transmission System Utilizing Compact 60-GHz-band Transmitter and Receiver," Microwave Symposium Digest, 2005 IEEE MTT-S International, Jun. 12-17, 2005, pp. 1867-1870, United States.

IEEE Draft P802.15.3/D16, "Draft Standard for Telecommunications and Information Exchange Between Systems—LAN/MAN Specific Requirements, Part 15.3: Wireless Medium Access Control (MAC) and Physical Layer (PHY) Specifications for High Rate Wireless Personal Area Networks (WPANs)," LAN/MAN Standard Committee, IEEE Computer Society, Feb. 2003, pp. 1-362, New York, NY, United States.

EIA/CEA-861-B, "A DTV Profile for Uncompressed High Speed Digital Interfaces," EIA Standard, EIA Engineering Standards and Publications, Electronic Industries Alliance Technology Strategy & Standards Department, May 2002, pp. i-117, Arlington, VA, United States.

Mboa et al., "Distributed Medium Access Control (MAC) for Wireless Networks,"0 Draft Version 0.99, MBOA/WiMedia Alliance, Nov. 1, 2005, pp. ii-176, United States.

International Search Report and Written Opinion dated Jul. 9, 2007 for International Application No. PCT/KR2007/001527 from Korean Intellectual Property Office, filed Mar. 29, 2007, pp. 1-8, Seo-gu, Daejeon, Republic of Korea.

International Search Report dated May 26, 2007 for International Application No. PCT/KR2007/000827 from Korean Intellectual Property Office, filed Feb. 15, 2007, pp. 1-2, Seo-gu, Daejeon, Republic of Korea.

International Search Report for dated Mar. 10, 2008 International Application No. PCT/KR2007/006148 from Korean Intellectual Property Office, filed Nov. 30, 2007, p. 1, Seo-gu, Daejeon, Republic of Korea.

Modiano, E., "An Adaptive Algorithm for Optimizing the Packet Size Used in Wireless ARQ Protocols," Wireless Networks, vol. 5, No. 4, Jul. 1999, pp. 279-286, United States.

Lettieri, P. et al., "Adaptive Frame Length Control for Improving Wireless Link Throughput, Range, and Energy Efficiency," INFOCOM Seventeenth Annual Joint Conference of the IEEE Computer and Communication Societies, vol. 2, Mar.-Apr. 1998, pp. 564-571, United States.

LG Electronics, Inc., "WirelessHD Specification Version 1.0 Overview," Oct. 9, 2007, pp. 1-77, United States.

"NEC Develops Compact Millimeter-Wave Transceiver for Uncompressed HDTV Signal Transmission", NE Asia Online, Apr. 1, 2005, (Downloaded from http://neasia.nikkeibp.com/topstory/000913 on Sep. 29, 2006), pp. 1-2, United States.

Hachman, M., "CE Giants back Amimon's Wireless HDTV Tech," PCMAG.com, Jul. 23, 2008, p. 1, United States.

International Standard ISO/IEC JTC 1/SC 29, "Information Technology, JPEG 2000 Image Coding System—Part 11: Wireless," ISO/IEC, Mar. 21, 2005, pp. 1-72, United States.

Hitachi, Ltd. et al., "High-Definition Multimedia Interface (HDMI) Specification Version 1.3," Jun. 22, 2006, pp. 1-237, United States.

International Search Report dated Oct. 12, 2007 for International Application No. PCT/KR2007/003251 from Korean Intellectual Property Office, filed Jul. 4, 2007, pp. 1-2, Seo-gu, Daejeon, Republic of Korea.

International Search Report dated May 22, 2007 for International Application No. PCT/KR2007/000802 from Korean Intellectual Property Office, filed Feb. 15, 2007, pp. 1-2, Seo-gu, Daejeon, Republic of Korea.

International Search Report dated Jul. 9, 2007 for International Application No. PCT/KR2007/001527 from Korean Intellectual Property Office, filed Mar. 29, 2007, pp. 1-2, Seo-gu, Daejeon, Republic of Korea.

International Preliminary Report on Patentability & Written Opinion dated Sep. 30, 2008 for International Application No. PCT/KR2007/001527 from Korean International Property Office, filed Mar. 29, 2007, pp. 1-13, Seo-gu, Daejeon, Republic of Korea.

International Preliminary Report on Patentability & Written Opinion dated May 19, 2009 for International Application No. PCT/KR2007/003251 from Korean International Property Office, filed Jul. 4, 2007, pp. 1-9, Seo-gu, Daejeon, Republic of Korea.

(56) References Cited

OTHER PUBLICATIONS

International Preliminary Report on Patentability & Written Opinion dated Jun. 16, 2009 for International Application No. PCT/KR2007/006148 from Korean International Property Office, filed Nov. 30, 2007, pp. 1-9, Seo-gu, Daejeon, Republic of Korea.

International Preliminary Report on Patentability & Written Opinion dated Aug. 19, 2008 for International Application No. PCT/KR2007/000827 from Korean International Property Office, filed Feb. 15, 2007, pp. 1-7, Seo-gu, Daejeon, Republic of Korea.

International Preliminary Report on Patentability & Written Opinion dated Aug. 19, 2008 for International Application No. PCT/KR2007/000802 from Korean International Property Office, filed Feb. 15, 2007, pp. 1-9, Seo-gu, Daejeon, Republic of Korea.

Caetano, L., "SiBEAM—60 GHz Architecture for Wireless Video Display," SiBEAM, Inc., White Paper, Mar. 2006, pp. 1-6, United States.

U.S. Non-final Office Action for U.S. Appl. No. 12/107,685 mailed Oct. 13, 2010.

U.S. Final Office Action for U.S. Appl. No. 11/833,919 mailed Sep. 30, 2010.

U.S. Restriction Requirement for U.S. Appl. No. 11/728,244 mailed Feb. 24, 2010.

U.S. Non-Final Office Action for U.S. Appl. No. 11/728,244 mailed Jun. 3, 2010.

U.S. Non-Final Office Action for U.S. Appl. No. 11/833,919 mailed May 26, 2010.

U.S. Notice of Allowance for U.S. Appl. No. 11/833,919 mailed Jan. 10, 2012.

U.S. Notice of Allowance for U.S. Appl. No. 12/107,685 mailed Jan. 5, 2012.

U.S. Final Office Action for U.S. Appl. No. 11/833,919 mailed Oct. 17, 2011.

U.S. Non-final Office Action for U.S. Appl. No. 12/107,685 mailed Sep. 6, 2011.

* cited by examiner

METHOD AND SYSTEM FOR BIT REORGANIZATION AND PACKETIZATION OF UNCOMPRESSED VIDEO FOR TRANSMISSION OVER WIRELESS COMMUNICATION CHANNELS

RELATED APPLICATION

This application claims priority from U.S. Provisional Patent Application Ser. No. 60/773,828, filed on Feb. 15, 2006, incorporated herein by reference.

FIELD OF THE INVENTION

The present invention relates to wireless communications, and in particular, to transmission of uncompressed video over wireless communication links.

BACKGROUND OF THE INVENTION

With the proliferation of high quality video, an increasing number of electronic devices (e.g., consumer electronic devices) utilize high-definition (HD) video. Conventionally, most devices compress the HD video, which can be over 1 Gbps (gigabits per second) in bandwidth, to a fraction of its size to allow for transmission between devices. However, with each compression and subsequent decompression of the video, some video information can be lost and the picture quality is degraded.

The High-Definition Multimedia Interface (HDMI) specification defines an interface for uncompressed HD transmission between devices through the HDMI cables (wired links). Three separate channels are used to transmit three pixel component streams (R, B, G or Y, $C_b$, $C_r$). For each channel, pixels are transmitted in a pixel-by-pixel order for each video line, and line-by-line for each video frame or field. The HDMI provides pixel-repetition functionality which repeats each pixel one or multiple times. The copies of each pixel directly follow the original pixel during the transmission at each pixel component channel.

Existing Wireless Local Area Networks (WLANs) and similar technologies do not have the bandwidth needed to carry uncompressed HD video, such as providing an air interface to transmit uncompressed video over a 60 GHz bandwidth. Further, existing networks can suffer from interference issues when several devices are connected, leading to video signal degradation.

BRIEF SUMMARY OF THE INVENTION

The present invention provides a method and a system for bit reorganization and packetization of uncompressed video, such as HD video, for transmission over wireless communication channels. The bit stream of the uncompressed video is reorganized according to importance levels of video bits. Then, various unequal protection methods are applied to bits at different video importance levels.

After the bit reorganization, encoding processes such as run-length coding (RLC) and forward error correction (FEC) are applied to more important bits to provide better protection for transmission, compared to less important bits. This improves the transmission robustness of uncompressed video over wireless channels, with the same data rate using bit reorganization, RLC and FEC. The reorganized and encoded information is then transmitted from a transmitter to a receiver over a wireless channel. The receiver performs the reverse steps of the transmitter, along with error detection/correction as needed, to recover the uncompressed video information.

These and other features, aspects and advantages of the present invention will become understood with reference to the following description, appended claims and accompanying figures.

BRIEF DESCRIPTION OF THE DRAWINGS

In the drawings, like references refer to similar elements.

DETAILED DESCRIPTION OF THE INVENTION

The present invention provides a method and a system for communication of uncompressed video, such as HD video, over a wireless channel. This involves performing bit reorganization and packetization for pixels of uncompressed video frames, for transmission over a wireless channel.

The bits in an uncompressed video bit stream are reorganized according to video importance levels of the bits. Bits at higher video importance levels have more significant contribution in terms of video information than bits at lower video importance levels.

After the bit reorganization, various unequal (different) protection levels are applied to the bits at different video importance levels. Preferably, the bits that provide more significant video information are provided with more protection for transmission. Encoding processes such as RLC and FEC can be applied to more important bits to provide stronger transmission protection compared to less important bits.

The reorganized and encoded bits are transmitted from one wireless communication station (the sender) to another wireless communication station (the receiver) over a wireless channel. The receiver then performs reverse steps of the sender to regenerate the uncompressed video bit stream and the corresponding uncompressed video frames.

Example implementations of the present invention for communication of uncompressed HD video frames are now described. A typical uncompressed HD video frame includes M rows and N lines (columns) of pixels, totaling M×N video pixels. The video pixels can be encoded in either a Red, Green, Blue (RGB) pixel component format, or different Y, $C_b$, $C_r$ pixel component formats such as 4:4:4 or 4:2:2. For a pixel having T bits, and with a frame updating frequency of f frame/second, the data rate required for transmission of an HD video frame is M×N×T×f bits per second. For example, in the 1080p video format, each frame has 1920 rows and 1080 lines, and each pixel has 24 bits, such that if the frame updating frequency is 60 frames/second, then the data rate is 1920× 1080×24×60=2,985,984,000 bps.

For each video pixel, if the RGB (or $YC_bC_r$ 4:4:4) format is used, usually each R, B, or G (or Y, $C_b$, $C_r$) pixel component has T/3 bits. If other $YC_bC_r$ formats except $YC_bC_r$ 4:4:4 are used, usually each pixel component has more bits than T/3. For example, in the HDMI specification where T is 24, each R, B, or G (or Y, $C_b$, $C_r$ in 4:4:4) pixel component has 8 bits per pixel. However, each Y, $C_b$ or $C_r$ pixel component has 12 bits in HDMI $YC_bC_r$ 4:2:2.

Figure 1:
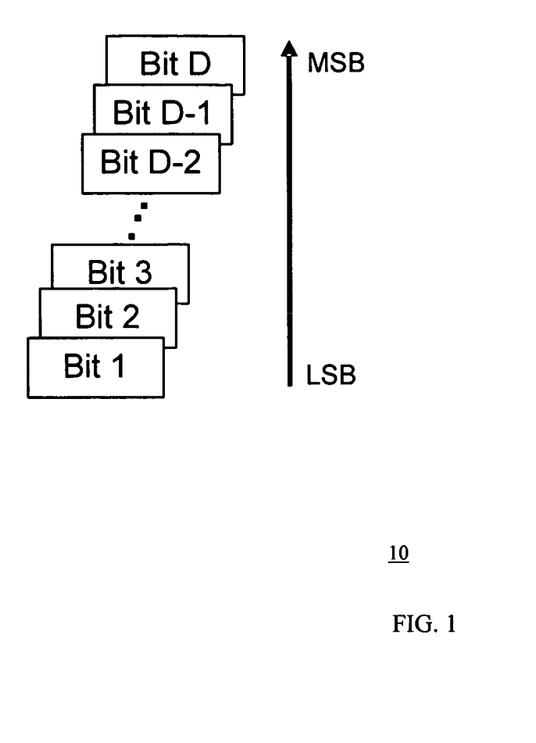
FIG. 1 shows an example bit plane for a video pixel.

FIG. 1 shows an example of bit planes 10 for a pixel component having D bits (i.e., Bit 1, . . . , Bit D) in D bit planes, wherein the D bits have different importance levels according to the contributions to the real value of the pixel component. The high order bits, usually called Most Significant Bits (MSBs), have more significant contribution than the lower order bits, called Least Significant Bits (LSBs).

Figure 2:
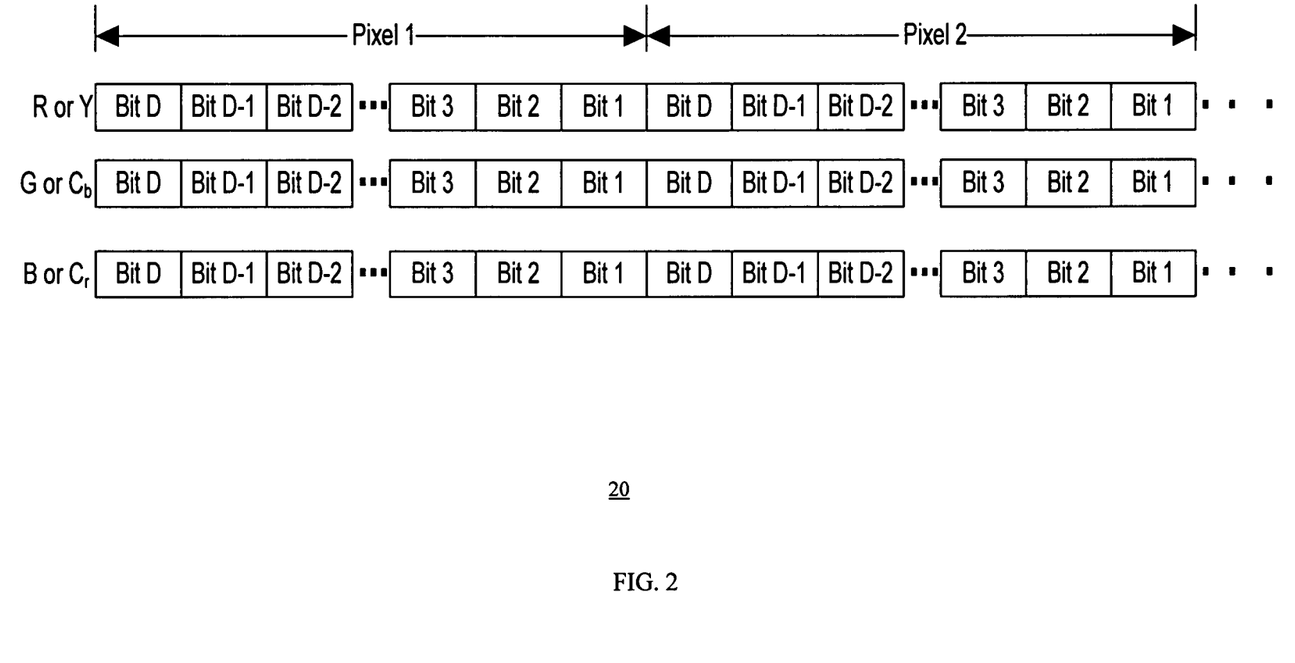
FIG. 2 shows an example bit order in uncompressed video pixels.

FIG. 2 shows an example pixel component bit order 20 for example pixels (i.e., Pixel 1, Pixel 2, etc.) in an uncompressed video stream. Conventionally in such a stream, after decoding, all MSBs and LSBs belonging to the same pixel are packed together since the stream is arranged in a pixel-by-pixel fashion (e.g., Pixel 1, Pixel 2, etc.). As such, bits with different important levels are mixed together as shown in FIG. 2.

An example bit reorganization process according to the present invention reorganizes and groups together (packetizes) bits of different pixels based on bit importance levels. For example, the MSBs of multiple pixels are grouped together and the LSBs of those pixels are grouped together.

The example bit reorganization and packetization process includes the steps of:
1. Reorganizing the bit order in each pixel component bit stream (e.g., R, B, G or Y, $C_b$, $C_r$) by grouping the bits at the same importance level together, and then serving different bit groups (at different importance levels) into different sub-streams. In this example, the number of importance levels is equal to the number of pixel component bit planes. As such, different bit groups (at different importance levels) are served into different bit plane sub-streams.
2. Prioritizing the sub-streams by determining a mapping between bit importance levels and transmission priorities, and then mapping the bits in the sub-streams at difference importance levels into transmission streams at different transmission priorities. If the total number of transmission priorities is less than the number of bit planes (importance levels), then multiple bit planes can be mapped to the same transmission priority. For example, if there are 8 bit planes for each pixel component of the video stream, but only 2 transmission priorities, then 4 MSBs may be mapped to a higher transmission priority, and 4 LSBs may be mapped to a lower transmission priority.
3. For each transmission priority, multiplexing bits of said sub-streams into streams at different transmission priorities, and then placing the multiplexed bits into transmission packets with different transmission priority levels.
4. Transmitting the packets over a wireless channel. Optionally a transmission Media Access Control (MAC) or a physical (PHY) layer differentiates the packets and provides Unequal Error Protection (UEP) for video bits with different transmission priorities.

Figure 3:
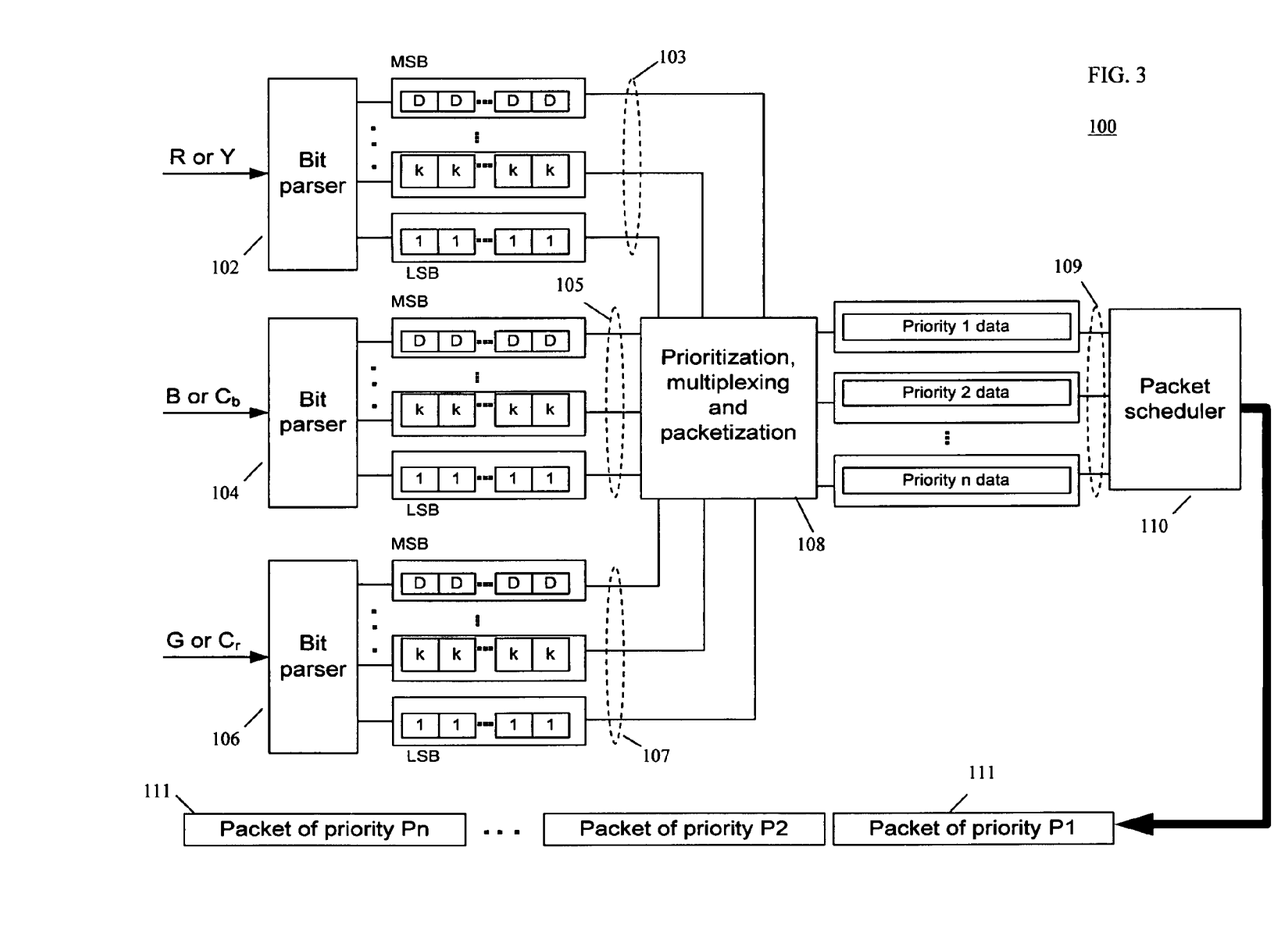
FIG. 3 shows a functional block diagram of a bit reorganization and packetizing system in a wireless communication station, according to an embodiment of the present invention.

FIG. 3 shows a functional block diagram of an example bit reorganization and packetizing system 100 that implements the above steps. The system 100 includes bit parsers 102, 104, and 106, a prioritization, multiplexing and packetizing (PMP) module 108 that performs said prioritization, multiplexing and packetizing steps. The system 100 further includes a packet scheduler 110 that transmits the packets at different priorities.

Specifically, the bits from the R pixel component of different pixels that are at the same importance level are placed into the same bit plane sub-stream by the parser 102. As such, the parser 102 reorganizes the R (or Y) pixel component bits of pixels 1, 2, . . . , etc. (FIG. 2) and generates D sub-streams 103 (sub-streams 1, . . . , D), wherein each sub-stream includes bits at the same bit plane (e.g., sub-stream 1 for LSBs, . . . , sub-stream D for MSBs). Similarly, the parsers 104 and 106 reorganize the B (or $C_b$) and the G (or $C_r$) pixel component bits and generates D sub-streams 105 and D sub-streams 107, respectively.

The PMP module 108 then multiplexes the sub-streams 103, 105 and 107, based on a transmission priority for each sub-stream, as described above. As such, the PMP module 108 generates 1, . . . , n transmission streams 109, wherein each transmission stream carries bits of certain priority (i.e., transmission stream 1 carries data bits at Priority 1, . . . , transmission stream n carries data bits at Priority n).

The packet scheduler 110 then places the multiplexed bits in different streams 109 into different transmission packets 111 with different priority levels (i.e., packets P1, . . . , Pn corresponding to priority P1, . . . , priority Pn, respectively). The packets 111 are then transmitted over a wireless channel, from a sender to a receiver.

Figure 4:
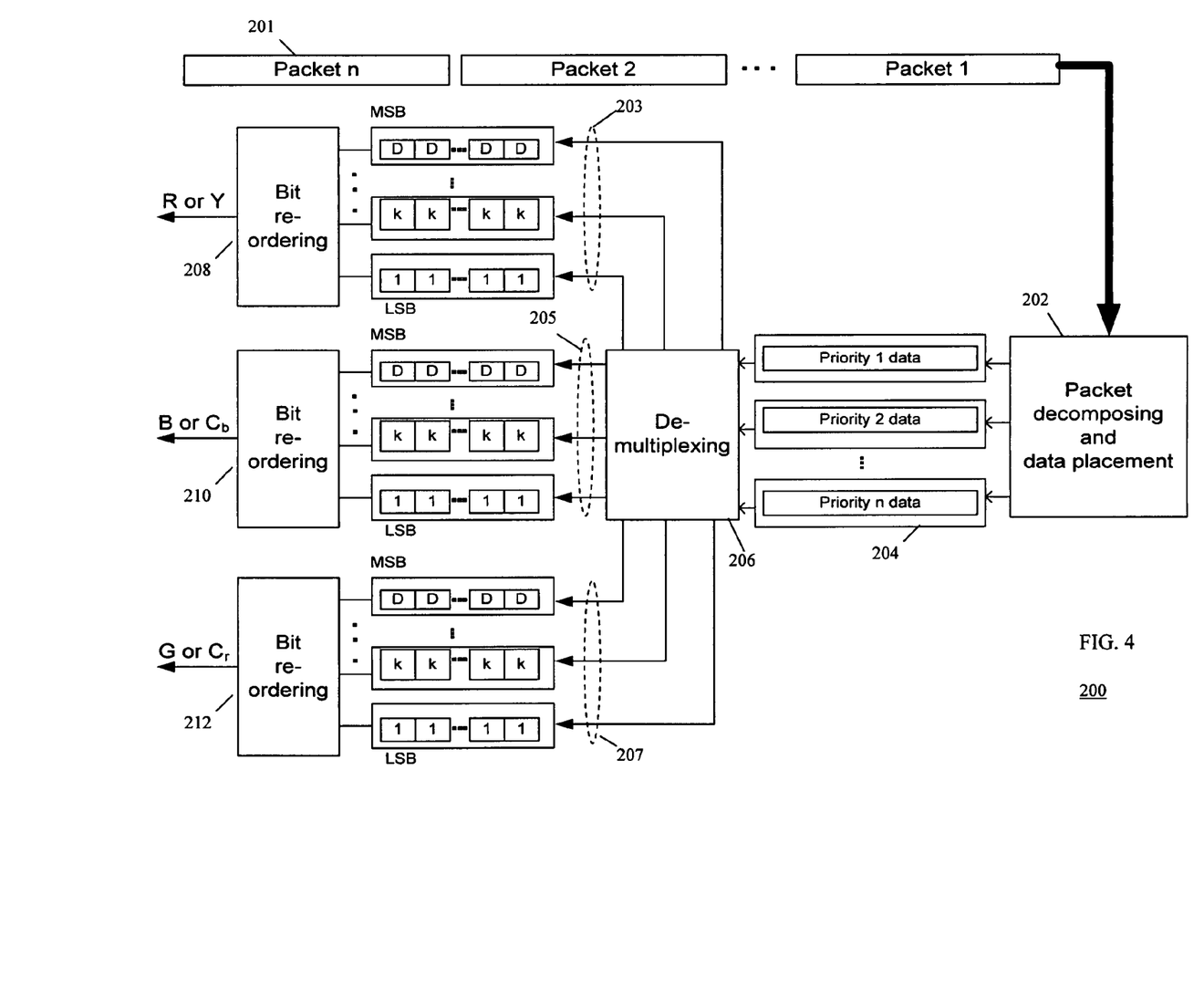
FIG. 4 shows a functional block diagram of a de-packetization and bit assembly system in a wireless communication station, according to an embodiment of the present invention.

Upon receiving the packets, the receiver performs de-packetization and assembly of the bits in the received packets by reverse steps of the sender. FIG. 4 shows a functional block diagram of an example de-packetization and bit assembly system 200, according to the present invention. The received packets 201 comprise packet 1, . . . , packet n, corresponding to Priority 1, . . . , Priority n, respectively. The bits in each packet 201 belong to different pixel component streams, and are processed by a module 202 which performs de-packetizing by packet decomposition, and bit assembly by data placement (PDDP). Specifically, the PDDP module 202 decomposes video information bits in each packet 201, such that bits in packet 1, . . . , packet n, are placed in n separate buffers 204 based on priority (i.e., a buffer for bits at Priority 1, . . . , a buffer for bits at Priority n).

Then, a de-multiplexing module 206 de-multiplexes the bits in the n buffers 204 back bit plane grouping. In this example, the de-multiplexing module 206 de-multiplexes the bits in the n buffers 204 back into D bit plane sub-streams for each pixel components. Specifically, in this example, the de-multiplexing module 206 de-multiplexes the bits in the n buffers 204 back into: (1) D bit plane sub-streams forming a bit stream 203 for the pixel component R (or Y), (2) D bit plane sub-streams forming a bit stream 205 for the pixel component B (or $C_b$), and (3) D bit plane sub-streams forming a bit stream 207 for pixel component G (or $C_r$).

As such, the stream 203 includes sub-streams 1, . . . , D for pixel component R or Y according to the bit plane of FIG. 1. Similarly, the stream 205 includes sub-streams 1, . . . , D for pixel component B or $C_b$. And, the stream 207 includes sub-streams 1, . . . , D for pixel component G or $C_r$.

After the information bits of all of the bit planes for a pixel component stream are received from the sender and processed by the PDDP module 202 and the de-multiplexing module 206, bit reordering modules 208, 210, and 212 perform bit reordering for the streams 203, 205, and 207, respectively. The bit reordering modules 208, 210, and 212, recover the original bit order of each pixel component stream such that different bits belonging to the same pixel are grouped together. Then, the recovered pixel component streams can be further processed (e.g., displayed) as uncompressed video.

According to further features of the present invention, after bit organization, an encoding process is applied to the more important bits (e.g., MSBs) before transmission by the sender, in order to provide stronger protection for more important bits in each pixel component stream. Examples of encoding include RLC and FEC encoding. An example of the bit reorganization and encoding process includes the steps of:

1. Reorganize the bit order for uncompressed video pixel component streams, group bits with the same importance level together, and place bits with different importance levels into the different sub-streams, as discussed above.
2. Perform RLC encoding for the sub-streams carrying MSBS. RLC encoding can reduce the data amount for MSBs since pixels that are geographically close to each other in the video frame typically have the same MSB values. Each sub-stream is segmented into fixed length units of bits before RLC encoding. The length of each unit depends on the packet size and buffer size limitations. RLC encoding is then applied to each fixed length unit. In one example, bits with the order between 1st and $K^{th}$ (i.e., $K^{th}$ bit in the D bits of the R, B or G component of each pixel) are not encoded, whereas, bits with the order between $(K+1)^{th}$ and $D^{th}$ bit in each pixel component, are encoded. As such, the transmitter differentiates the bits and provides UEP for bits with different importance levels according to the bit plane (FIG. 1). The more important bits (i.e., bits with the order between $(K+1)^{th}$ and $D^{th}$) are provided with higher protection due to encoding, while the less important bits (i.e., bits with the order between 1st and $K^{th}$) are not encoded. Due to variable bit patterns in each unit; the encoded units may have variable lengths. K can be selected based on the level of protection desired and further based on bandwidth/buffer availability. Further, various bits in a unit can be encoded with different encoding processes. In addition, FEC information can be added to RLC encoded units of the sub-streams carrying more important bits (e.g., $(K+1)^{th}$ to $D^{th}$ sub-streams). It is also possible to add FEC information to un-encoded LSB sub-streams (e.g., 1st to $K^{th}$ sub-streams). However, stronger FEC protection must be provided for $(K+1)^{th}$ to $D^{th}$ sub-streams.
3. Determine the mapping between bit importance levels and transmission priorities, as discussed above.
4. For sub-streams with the same transmission priority, multiplex sub-streams of different pixel components, and place the multiplexed information into transmission packets with different priority levels, as discussed above.

Figure 5:
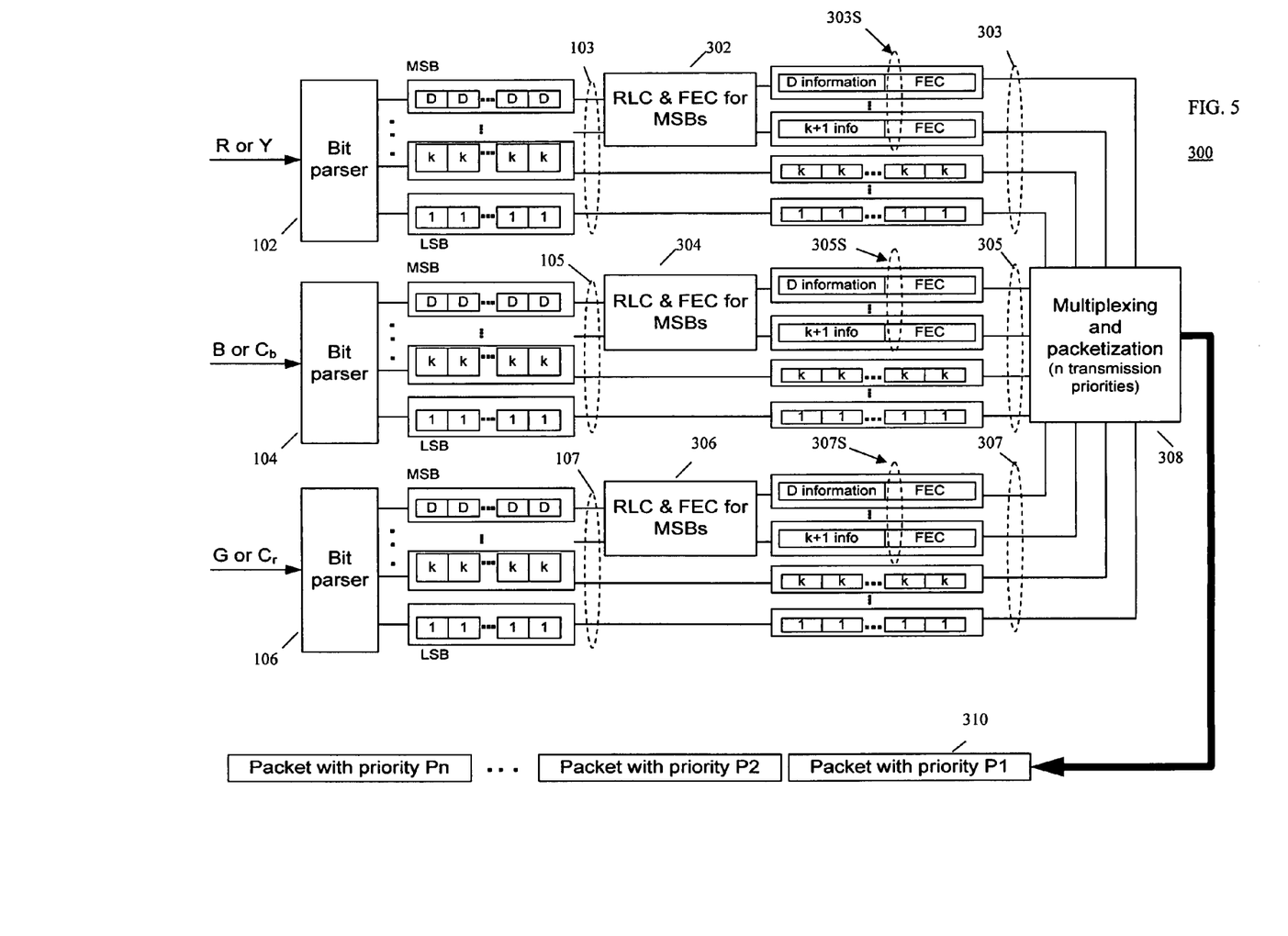
FIG. 5 shows a functional block diagram of another bit reorganization and packetizing system in a wireless communication station, according to an embodiment of the present invention.

FIG. 5 shows a functional block diagram of a bit reorganization and packetizing system 300 that implements the above reorganization and encoding process. The system 300 includes bit parsers 102, 104, and 106 (as in FIG. 3), encoding modules 302, 304, and 306 and a multiplexing and packetizing module 308.

The parsers 102, 104 and 106 operate as described in relation to FIG. 3 to generate sub-streams 103, 105 and 107, and therefore are not described further here. The encoding module 302 performs encoding (RLC and FEC) on the sub-streams 103 carrying MSBs, as described. Similarly, the encoding modules 304 and 306 perform encoding on the sub-streams 105 and 107 carrying MSBs, respectively, as described. In this example, the encoding modules 302, 304 and 306 operate on the $(K+1)^{th}$ to the $D^{th}$ bits (e.g., MSBs) of the subs-streams 103, 105, and 107, to generate partially encoded streams 303, 305 and 307, respectively. In the stream 303, only sub-streams 303S (i.e., $(K+1)^{th}$ to $D^{th}$ sub-streams) of the pixel component R or Y, are RLC and FEC encoded (1st to $K^{th}$ sub-streams are not encoded). Similarly, in the stream 305, only sub-streams 305S (i.e., $(K+1)^{th}$ to $D^{th}$ sub-streams) of the pixel component B or $C_b$, are RLC and FEC encoded (1st to $K^{th}$ sub-streams are not encoded). And, in the stream 307, only sub-streams 307S (i.e., $(K+1)^{th}$ to $D^{th}$ sub-streams) of the pixel component G or $C_r$, are RLC and FEC encoded (1st to $K^{th}$ sub-streams are not encoded).

The multiplexing and packetizing module 308 then multiplexes the sub-streams 303, 305 and 307 of the different pixel components and places the multiplexed information into n transmission packets 310 with different priority levels (i.e., packets P1, ..., Pn corresponding to priority P1, ..., priority Pn, respectively). In this example, the module 308 performs a similar function as a combination of the PMP module 108 and the scheduler module 110 in FIG. 3, and is therefore not described further here. Alternatively, FEC information can be added after multiplexing sub-streams instead of before multiplexing. The packets 310 are then transmitted from a sender to a receiver via a wireless channel.

Figure 6:
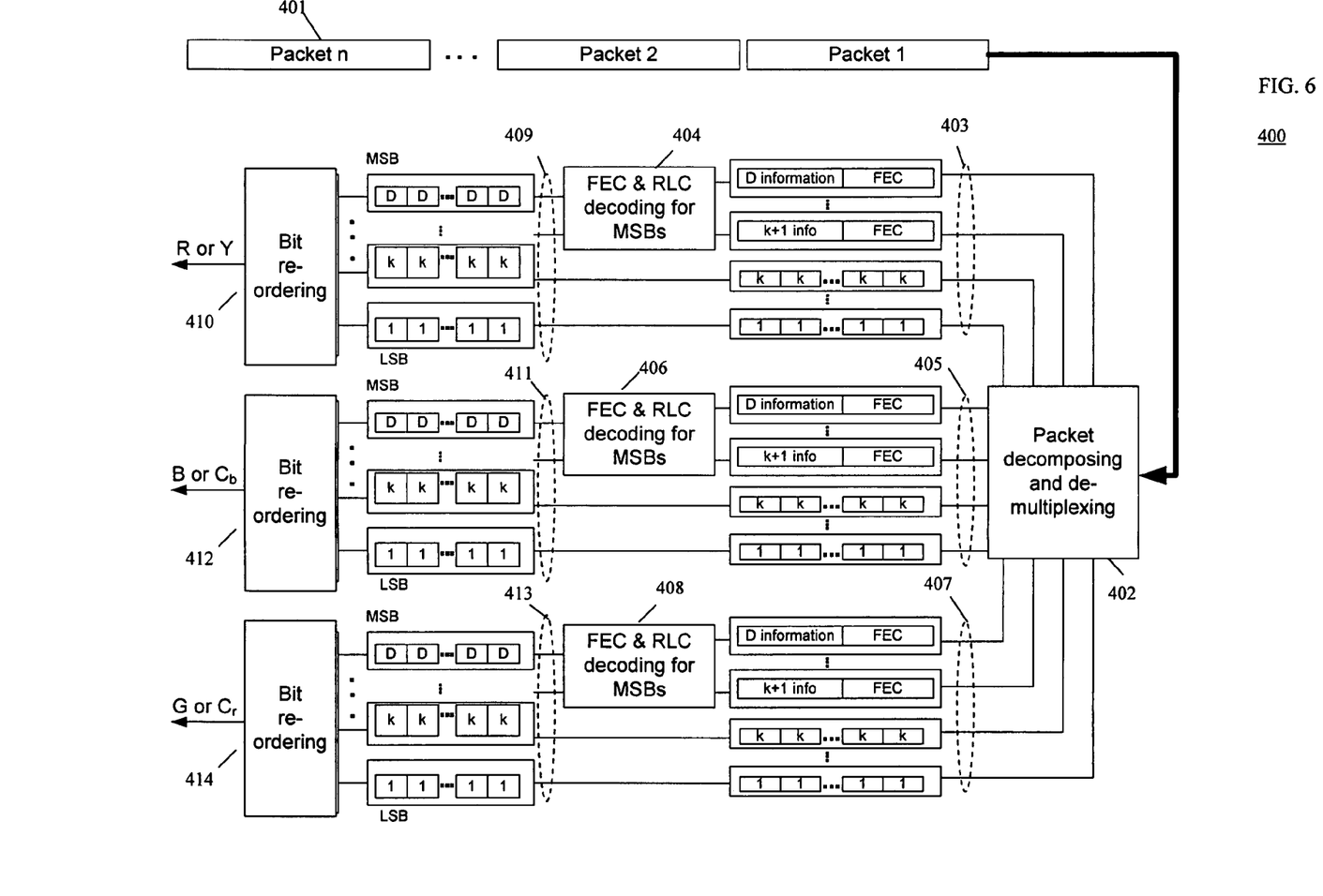
FIG. 6 shows a functional block diagram of another de-packetization and bit assembly system including decoding, in a wireless communication station, according to an embodiment of the present invention.

Upon receiving the packets, the receiver performs de-packetization and assembly of the bits in the received packets by reverse steps of the sender. FIG. 6 shows a functional block diagram of an example de-packetization and bit assembly system 400, according to the present invention. The received packets 401 comprise packet 1, packet n, corresponding to Priority 1, ..., Priority n, respectively.

The bits in each packet 401 belong to different pixel component streams, and are processed by a module 402 which performs de-packetizing by packet decomposition, bit assembly by data placement, and de-multiplexing by de-multiplexing (PDP). In this example, the PDP module 402 performs the functions of a combination of the module PDDP module 202, the buffers 204 and the de-multiplexing module 206 in FIG. 4, and is therefore not described further here. As such, the bits in packets 1, ..., n, are decomposed and deplexed into streams 403, 405 and 407, corresponding to the three pixel component streams R (or Y), B (or $C_b$) and G (or $C_r$), respectively. Each stream includes 1, ..., D sub-streams. The 1st to the $K^{th}$ sub-streams in each of the streams 403, 405 and 407 arrive without encoding, and as such need no decoding at the receiver. The encoded $(K+1)^{th}$ to the $D^{th}$ sub-streams of each of the streams 403, 405 and 407 are decoded by decoders 404, 406, and 408, respectively. Each of the decoders 403, 405 and 407, performs FEC and RLC decoding. Bit error correction is performed based on the FEC information.

The 1st to the $K^{th}$ sub-streams and the decoded $(K+1)^{th}$ to the $D^{th}$ sub-streams, of each of the streams 403, 405 and 407, form bit streams 409, 411 and 413, respectively. The bit streams 409, 411 and 413, correspond to the pixel components R (or Y), B (or $C_b$), and G (or $C_r$), respectively, with bits placed in their proper places in separate pixel component buffers based on bit plane position of the information.

As such, the stream 409 includes sub-streams 1, ..., D for pixel component R or Y according to the bit plane of FIG. 1. Similarly, the stream 411 includes sub-streams 1, ..., D for pixel component B or $C_b$. And, the stream 413 includes sub-streams 1, ..., D for pixel component G or $C_r$.

After information bits of all bit planes for a pixel component stream are received from the sender, then bit reordering modules 410, 412, and 414 (which function similar to bit reordering 208, 210, and 212 in FIG. 4), perform bit reordering for the streams 409, 411, and 413, respectively. The bit reordering modules 410, 412, and 414, recover the original bit order of each pixel component stream such that different bits belonging to the same pixel are grouped together. Then, the recovered pixel component streams can be further processed (e.g., displayed) as uncompressed video by higher layers.

Figure 7:
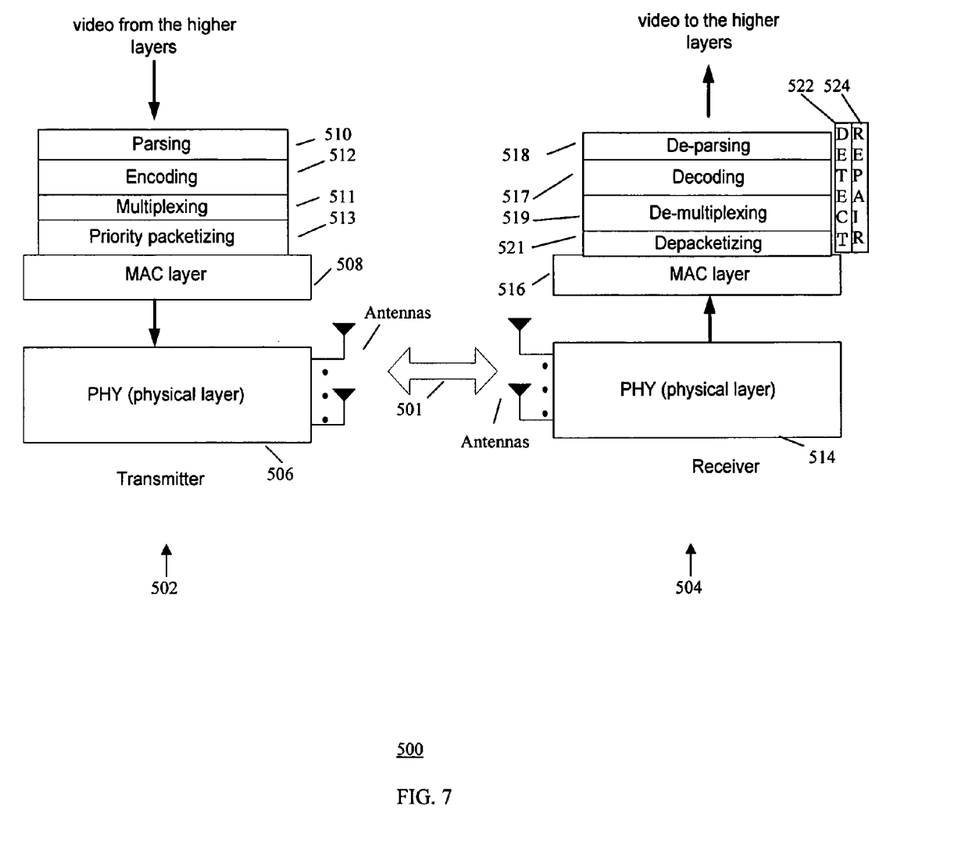
FIG. 7 shows a functional block diagram of an example communication system including a transmitter station and a receiver station implementing bit reorganization and packetization mechanism for communication of uncompressed HD video over a wireless channel, according to an embodiment of the present invention.

FIG. 7 shows a functional block diagram of an example wireless communication system 500, according to an embodiment of the present invention, including a wireless communication station 502 functioning as a transmitter (a sender) and a wireless communication station functioning as a receiver 504, which implement an example process for communicating uncompressed video, as discussed above. The transmitter 502 includes a PHY layer 506 and a MAC layer 508. Similarly, the receiver 504 includes a PHY layer 514 and a MAC layer 516. The PHY and MAC layers provide wireless communication between the transmitter 502 and the receiver 504 via antennas through a wireless channel 501.

The transmitter 502 further includes: a parsing module 510 implementing the function of the above-mentioned parsers 102, 104, and 106 (FIG. 5); optionally an encoding module 512 implementing the function of the above-mentioned encoders 302, 304, or 306; a multiplexing module 511 implementing the function of the above-mentioned multiplexing modules 108 and/or 308; priority packetizing module 513 implementing the function of the above-mentioned packet scheduler 110 and/or 308.

The PHY/MAC layers of the transmitter 502 add PHY and MAC headers to packets and transmit the packets to the receiver 504 over the wireless channel 501. In the wireless receiver 504, the PHY/MAC layers 514 and 516 process the received packets. The receiver 504 further includes a de-packetizing module 521, a de-multiplexing module 519, optionally a decoding module 517, and a bit reorganization (de-parsing) module 518.

The depacketizing module 521 and the de-multiplexing module 519 together implement the function of the PDP module 402 (FIG. 6). The depacketizing module 521 analyzes the PHY and MAC headers of the received packets and obtains the data payload information. The de-multiplexing module 519 deplexes and separates information for different pixel components (R, B, G or Y, $C_b$, $C_r$), and also separates bits with different bit-plane orders (FIG. 1) for each pixel component. The decoding module 517 implements the function of the decoding modules 404, 406 and 408, performing FEC and RLC decoding and reconstructing the original video pixel bits. The bit reorganization module 518 implements the function of the reordering modules 410, 412, and 414, reordering all of the bits belonging to the same pixel component (e.g., R, B or G) of each pixel and recovers the original bit order (MSB to LSB) for R, B, G or Y, $C_b$, $C_r$. Further, error correction is applied when FEC information is provided for less important bits. The receiver 504 can further include an error detection module 522 and an error correction module 524. The error detection module 522 detects lost or damaged bits in packets (e.g., using Cyclic Redundancy Code (CRC) information). The correction module 524 utilizes FEC information (or other correction methods agreed upon by the transmitter and the receiver) to compensate for the lost or damaged bits.

Although in relation of FIG. 7, the stations 502 and 504 have been described as a transmitter and a receiver, respectively, each is a type of wireless communication station (as noted) capable of transmitting and/or receiving over a wireless channel in a wireless communication system such as a WLAN. Therefore, a wireless communication station herein can function as a transmitter, a sender, a receiver, an initiator and/or a responder.

As is known to those skilled in the art, the aforementioned example architectures described above, according to the present invention, can be implemented in many ways, such as program instructions for execution by a processor, as logic circuits, as an ASIC, as firmware, etc.

The present invention has been described in considerable detail with reference to certain preferred versions thereof; however, other versions are possible. Therefore, the spirit and scope of the appended claims should not be limited to the description of the preferred versions contained herein.

What is claimed is:

1. A method of transmitting uncompressed video over a wireless channel, comprising:

reorganizing uncompressed video pixels, each video pixel comprising pixel components having component bits including high video importance level component bits and lower video importance level component bits, wherein high video importance level component bits provide more significant video information than low importance level video importance level component bits;

wherein reorganizing uncompressed video pixels comprises reorganizing the component bits for each pixel component into different groups according to video importance level of the component bits;

mapping the different groups to different transmission priorities;

packetizing the component bits of different groups into separate packets based on the mapped transmission priority; and transmitting each packet over a wireless channel based on the different transmission priorities.

2. The method of claim 1 further comprising: after bit reorganization, applying unequal protection to component bits at different importance levels.

3. The method of claim 2 further comprising: applying unequal protection to component bits at different importance levels, wherein more important video bits are provided with more protection for transmission.

4. The method of claim 1 further comprising: after bit reorganization, applying encoding to component bits at higher importance levels to improve transmission robustness.

5. The method of claim 4 wherein encoding comprises performing RLC encoding.

6. The method of claim 4 wherein encoding comprises performing FEC encoding.

7. The method of claim 2 wherein uncompressed video information comprised of high definition video information and the higher order bits are of higher video importance.

8. The method of claim 1 further comprising:
receiving a transmitted packet of component bits;
placing the component bits in corresponding separate pixel component buffers based on bit importance level; and
reordering the component bits in the pixel component buffers to recover an original bit order of a bit stream based on component bit importance level, wherein different bits belonging to the same pixel component are grouped together.

9. The method of claim 1, wherein:
reorganizing further includes reorganizing a bit order for bits in each component bit stream by groupies bits with the same importance level together;

packetizing further includes:
serving the component bits with different importance levels into different sub-streams, wherein a number of importance levels is equal to a number of pixel component bit planes;
prioritizing the different sub-streams by determining a mapping between different component bit importance levels and different transmission priorities;
mapping the bits in the different sub-streams at different component bit importance levels into transmission streams at the different transmission priorities; and
for sub-streams at the same transmission priority, multiplexing sub-streams of different component bits into transmission packets with different transmission priority levels.

10. The method of claim 9 further comprising: after bit reorganization, applying unequal protection to component bits at different video importance levels.

11. The method of claim 9 further comprising providing error correction information for the component bits.

12. The method of claim 9 further comprising: after bit reorganization, applying encoding to component bits at higher video importance levels.

13. The method of claim 9 further comprising:
receiving a transmitted packet of component bits;
decomposing a packet payload component bits belonging to different component bit streams and placing the component bits in separate corresponding pixel component buffers based on component bit importance level;
de-multiplexing the bits in the buffers back into importance level groupings; and
reordering the component bits in the level groupings to recover the original bit order of each pixel component stream, wherein different bits belonging to the same pixel component are grouped together.

14. The method of claim 13, wherein decomposing further includes:
decomposing the packet payload component bits belonging to different component bit streams including encoded bits;
decoding the encoded bits; and
placing the bits in proper places in corresponding pixel component buffers based on a bit plane position.

15. The method of claim 14, wherein decoding further includes performing error correction for FEC encoded bits.

16. The method of claim 14, wherein decoding further includes performing RLC decoding for RLC encoded bits.

17. A wireless communication system, comprising:
a wireless transmitter including a first physical layer:
a bit reorganizer that reorganizes uncompressed video pixels, each video pixel comprising pixel components having component bits including high video importance level component bits and lower video importance level component bits for each pixel component, into different groups according to video importance level of the component bits, wherein high video importance level component bits provide more significant video information than low importance level video importance level component bits; and
a packetizer that maps the different groups to different transmission priorities, and packetizes the component bits of the different groups into separate packets based on the mapped transmission priority for transmission over a wireless channel according to the different transmission priorities; and
a wireless receiver including a second physical layer for receiving packets over the wireless channel.

18. The system of claim 17, wherein the transmitter further includes an UEP module that applies unequal protection to bits at different importance levels.

19. The system of claim 18, wherein the UEP module applies unequal protection to bits at different importance levels, wherein more important video bits are provided with more protection for transmission.

20. The system of claim 17, wherein the transmitter further includes an encoder that applies encoding to the reorganized bits at higher importance levels to improve transmission robustness.

21. The system of claim 20, wherein the encoder performs RLC encoding.

22. The system of claim 20, wherein the encoder performs FEC encoding.

23. The system of claim 18, wherein higher order bits are of higher video importance.

24. The system of claim 17 wherein the receiver comprises:
a depacketizer receives a transmitted packet of bits and place the bits in separate corresponding pixel component buffers based on bit importance level; and
a reordering module reorders the bits in the buffers to recover an original bit order of a bit stream based on bit importance level, wherein different bits belonging to the same pixel component are grouped together.

25. The system of claim 17, wherein:
the video pixel component bits comprise a bit stream of uncompressed video pixel information, including one or more video pixel component bit streams; and
the bit reorganizer reorganizes a bit order for bits in each component bit stream by grouping bits with the same importance level together;
the packetizer includes:
a prioritization module that:
serves the bits with different importance levels into different sub-streams, wherein a number of importance levels is equal to a number of pixel component bit planes,
prioritizes the different sub-streams by determining a mapping between different bit importance levels and different transmission priorities, and
maps the bits in the different sub-streams at different component bit importance levels into transmission streams at the different transmission priorities; and
a multiplexer that, for sub-streams at the same transmission priority, multiplexes sub-streams of different pixel components into transmission packets with different transmission priority levels.

26. The system of claim 25, wherein the transmitter further includes an UEP module that applies unequal protection to bits at different importance levels.

27. The system of claim 25, wherein the transmitter further includes an encoder that applies encoding to the reorganized bits at higher importance levels to improve transmission robustness.

28. The system of claim 25 wherein:
the wireless receiver receives one or more transmitted packet of bits, the receiver including:
a depacketizer that decomposes a packet payload bits belonging to different component bit streams and place the bits in separate corresponding pixel component buffers based on bit importance level;
a de-multiplexer that de-multiplexes the bits in the buffers back into importance level groupings; and
a reordering module that reorders the bits in the importance level groupings to recover the original bit order of each pixel component stream, wherein different bits belonging to the same pixel component are grouped together.

29. The system of claim 28, wherein:
the depacketizer decomposes the bits belonging to different component bit streams including encoded bits; and
the receiver further includes a decoder that decodes the encoded bits.

30. The system of claim 29, wherein the receiver further includes an error correction module that performs error correction for FEC encoded bits.

31. The system of claim 29, wherein the decoder performs RLC decoding for RLC encoded bits.

32. A wireless transmitter, comprising:
a processor;
a bit reorganizer that uses the processor for reorganizing uncompressed video pixels, each video pixel comprising pixel components having component bits including high video importance level component bits and lower video importance level component bits for each pixel component, into different groups according to video importance level of the component bits, wherein high video importance level component bits provide more significant video information than low importance level video importance level component bits; and
a packetizer that uses the processor for mapping the different groups to different transmission priorities, and for packetizing the component bits of different groups into separate packets according to transmission priority for transmission over a wireless channel based on the different transmission priorities.

33. The transmitter of claim 32 further comprising an UEP module that applies unequal protection to bits at different importance levels.

34. The transmitter of claim 33, wherein the UEP module applies unequal protection to bits at different importance levels, wherein more important video bits are provided with more protection for transmission.

35. The transmitter of claim 32 further comprising an encoder that applies encoding to the reorganized bits at higher importance levels to improve transmission robustness.

36. The transmitter of claim 35, wherein the encoder performs RLC encoding.

37. The transmitter of claim 35, wherein the encoder performs FEC encoding.

38. The transmitter of claim 33, wherein higher order bits are of higher video importance.

39. The transmitter of claim 32, wherein:
the video pixel component bits comprise a bit stream of uncompressed video pixel information, including one or more video pixel component bit streams;
the bit reorganizer reorganizes a bit order for bits in each component bit stream by groupies bits with the same importance level together;
the packetizer includes:
a prioritization module that serves the bits with different importance levels into different sub-streams by determining a mapping between different bit importance levels and different transmission priorities, and maps the bits in the different sub-streams at different component bit importance levels into transmission streams at the different transmission priorities, wherein a number of importance levels is equal to a number of pixel component bit planes; and
a multiplexer that, for sub-streams at the same transmission priority, multiplexes sub-streams of different pixel components into transmission packets with different transmission priority levels.

40. The transmitter of claim 39 further comprising an UEP module that applies unequal protection to bits at different importance levels.

41. The transmitter of claim 39 further comprising an encoder that applies encoding to the reorganized bits at higher importance levels to improve transmission robustness.

42. A wireless receiver, comprising:
a processor;
a depacketizer that uses the processor for receiving transmitted packets of different priority transmission, the transmitted packets comprising video pixels, each comprising pixel components having component bits including high video importance level component bits and lower video importance level component bits, and the depacketizer places the component bits for each pixel component in separate corresponding pixel component buffers based on component bit importance level, wherein high video importance level component bits provide more significant video information than low importance level video importance level component bits; and
a reordering module that uses the processor for reordering the bits in the pixel component buffers to recover an original bit order of a bit stream based on bit importance level, wherein different bits belonging to the same pixel component are grouped together.

43. The receiver of claim 42 wherein the depacketizer decomposes a packet payload bits belonging to different component bit streams and places the bits in separate in corresponding pixel component buffers based on bit importance level.

44. The receiver of claim 42, wherein:
the depacketizer decomposes the bits belonging to different component bit streams including encoded bits; and
the receiver further comprising a decoder that decodes the encoded bits.

45. The receiver of claim 42 further comprising an error correction module that performs error correction for FEC encoded bits.

46. The receiver of claim 42, wherein the decoder performs RLC decoding for RLC encoded bits.

47. The receiver of claim 42, wherein the decoder performs FEC decoding for FEC encoded bits.

48. The receiver of claim 42, further comprising a de-multiplexer that de-multiplexes the bits in the buffers back into importance level groupings, such that the reordering module reorders the bits in the importance level groupings to recover the original bit order of each pixel component stream, wherein different bits belonging to the same pixel component are grouped together.

49. The method of claim 1, wherein high video importance level component bits of video pixels comprise most significant bits (MSBs) and the lower video importance level component bits comprise least significant bits (LSBs).

50. The method of claim 49, wherein packetizing the bits of different groups into separate packets comprises mapping a first group of pixel component bits comprising MSBs to a first packet and mapping a second group of pixel component bits comprising LSBs to a second packet.

51. The method of claim 50, wherein the first packet is associated with a higher transmission priority than the second packet.

52. The method of claim 51, wherein the first packet is transmitted at a first priority, and the second packet is transmitted at a second priority.

53. The method of claim 52, wherein the first priority and the second priority are different.

54. The method of claim 9, further comprising:
for sub-streams at different transmission priorities, multiplexing sub-streams of different component bits into transmission packets at different transmission priorities, and
placing the multiplexed bits into transmission packets with different transmission priority levels.

55. The method of claim 1, wherein a number of importance levels is equal to a number of pixel component bit planes.

56. The method of claim 55, wherein packetizing further comprises serving different bit groups at different importance levels into different bit plane sub-streams.

* * * * *